UNITED STATES PATENT OFFICE.

ERIK W. ENEQUIST, OF FLUSHING, NEW YORK.

PROCESS OF OBTAINING CARBONIC ACID, SODIUM SULFATE, AND MAGNESIUM SULFATE, &c.

SPECIFICATION forming part of Letters Patent No. 523,651, dated July 24, 1894.

Application filed July 6, 1891. Serial No. 398,615. (No specimens.)

*To all whom it may concern:*

Be it known that I, ERIK W. ENEQUIST, a subject of the King of Sweden and Norway, and a resident of Flushing, in the county of Queens and State of New York, have invented certain new and useful Improvements in the Process of Manufacturing Carbonic Acid, Carbonate of Magnesia, and a Pure Alkaline Sulfate, of which the following is a specification.

My invention consists in the employment of a solution of niter-cake (containing about twenty-four to twenty-eight per-cent. of free sulfuric acid) or an alkaline acid sulfate, as a solvent for magnesite in the production of carbonic acid instead of ordinary sulfuric acid and marble dust or magnesite as now used, whereby the acid is obtained at less expense, the niter-cake or the acid sulfate containing it being of comparatively little value, and through the elimination of the acid therefrom in the process the value of the resultant pure alkaline sulfate is considerably increased.

In carrying out the process about nine thousand three hundred pounds of niter-cake containing about twenty-five per-cent. of free sulfuric acid, or a corresponding quantity of another acid sulfate is dissolved in about eighteen thousand pounds or less of water and brought in contact with magnesite of which about two thousand pounds will be dissolved by the acid solution. The mass is then gradually heated when carbonic acid gas escapes in a uniform manner and is washed and compressed or otherwise utilized, about a thousand pounds of gas being obtained. When the production of gas has come to an end and the solution has been heated to boiling, it has an alkaline reaction which takes place, probably, on account of a tendency with the magnesite or magnesium carbonate to dissolve in the presence of carbonic acid, forming a magnesium bicarbonate which is decomposed as soon as the solution is heated to boiling, and iron, aluminous and silicious matters and other impurities are precipitated in consequence. The colorless solution contains sodium sulfate and magnesium sulfate and registers about 36° to 38° Baumé and to this solution is added a solution of sodium carbonate made from about two thousand seven hundred pounds of fifty-eight per-cent. soda ash when magnesium carbonate is precipitated and more sodium sulfate is formed, said precipitate is separated from the sodium sulfate solution in any suitable manner, washed and dried; it may subsequently be converted into magnesium oxide or basic carbonate, &c.

I am aware of the old process of neutralizing niter-cake by calcium carbonate, and I make no claim to such process in which the calcium sulfate precipitates together with the excess of the calcium carbonate and remains as valueless residue, while in my process the free sulfuric acid in the acid sulfate dissolves an equivalent quantity of magnesite yielding a large quantity of Epsom salts. By this process I avoid the use of a pure sulfuric acid in order to produce said salt.

I am also aware of the well known re-action produced in the baking process through the effect of the liquid used in the preparation of the dough on the mixture of powdered sodium bisulfate and magnesium carbonate, evolving carbonic acid to raise the dough, in going to waste, as described in Peters's Patent, No. 331,541, dated December 1, 1885, and I do not claim such process. My invention is distinguished from that in the treatment of a solution of crude niter-cake with the mineral magnesite and recovering the several products of carbonic acid, sodium sulfate and magnesium carbonate for commercial purposes, which is a process not disclosed in the Peters patent and not feasible with the expensive refined materials he uses, besides the impure materials which I use would be unsafe in baking powder.

I claim—

1. The process of treating a solution of niter-cake with magnesite, forming carbonic acid, and a mixture of sodium sulfate, and magnesium sulfate substantially as described.

2. The process of producing carbonic acid and a mixture of sodium sulfate and magnesium sulfate, by treating magnesium carbonate with an alkaline acid sulfate, evolving carbonic acid gas, and causing an alkaline re-action, precipitating iron, aluminous and silicious matters and other impurities, and removing the same substantially as described.

3. The process of producing carbonic acid, magnesium carbonate and a pure sodium sulfate, by treating a solution of niter-cake with magnesite, evolving carbonic acid, precipitating iron and other impurities and removing the same, adding sodium carbonate and separating the magnesium carbonate from the sodium sulfate.

Signed at New York, in the county of New York and State of New York, this 26th day of June, A. D. 1891.

ERIK W. ENEQUIST.

Witnesses:
W. J. MORGAN,
W. B. EARLL.